United States Patent [19]

Bartholomew

[11] Patent Number: 4,605,262
[45] Date of Patent: Aug. 12, 1986

[54] THREE WAY CHECK VALVE

[75] Inventor: Roy E. Bartholomew, Elyria, Ohio

[73] Assignee: Allied Corporation, Morristown, N.J.

[21] Appl. No.: 648,200

[22] Filed: Sep. 7, 1984

[51] Int. Cl.⁴ .................. G05D 11/00; B60T 15/46
[52] U.S. Cl. .................. 303/84 A; 137/112; 188/151 A
[58] Field of Search .......... 303/84 A, 9, 84 R; 188/151 A; 137/112, 512, 512.2

[56] References Cited

U.S. PATENT DOCUMENTS

| | | | |
|---|---|---|---|
| 1,359,988 | 11/1920 | Hawsen | 137/512 |
| 2,335,814 | 11/1943 | Stevenson | 277/20 |
| 2,366,608 | 1/1945 | Freeman | 188/152 |
| 3,362,633 | 1/1968 | Freeman | 235/201 |
| 4,187,871 | 2/1980 | Hendrickson | 137/112 |
| 4,281,677 | 8/1981 | Hoffman | 137/113 |
| 4,368,752 | 1/1983 | Tamamori et al. | 137/112 |
| 4,397,505 | 8/1983 | Linkner, Jr. | 303/9 |
| 4,467,825 | 8/1984 | Boyd | 137/112 |

Primary Examiner—Bruce H. Stoner, Jr.
Assistant Examiner—Alvin Oberley
Attorney, Agent, or Firm—K. C. Decker; Antonis W. N.

[57] ABSTRACT

A three way check valve for a vehicle fluid pressure braking system includes a housing having first, second and third inlet ports and an outlet port. A pair of shuttles are slidably mounted in the housing, and are responsive to variations in the fluid pressure at the first, second and third inlet ports to communicate the inlet port having the highest pressure level to the outlet port, and to terminate communication through the other inlet ports to prevent back-flowing from one inlet port to the other inlet port.

3 Claims, 5 Drawing Figures

U.S. Patent   Aug. 12, 1986   4,605,262
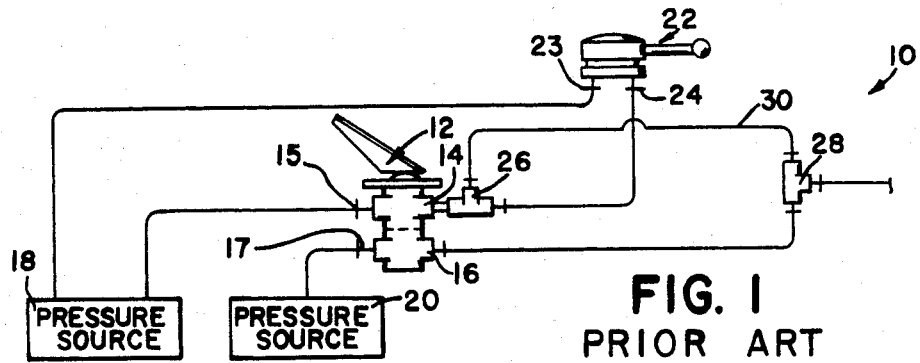
FIG. 1
PRIOR ART
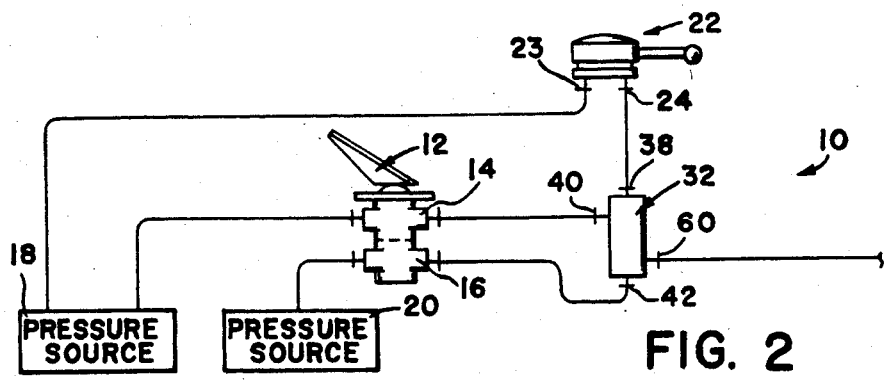
FIG. 2
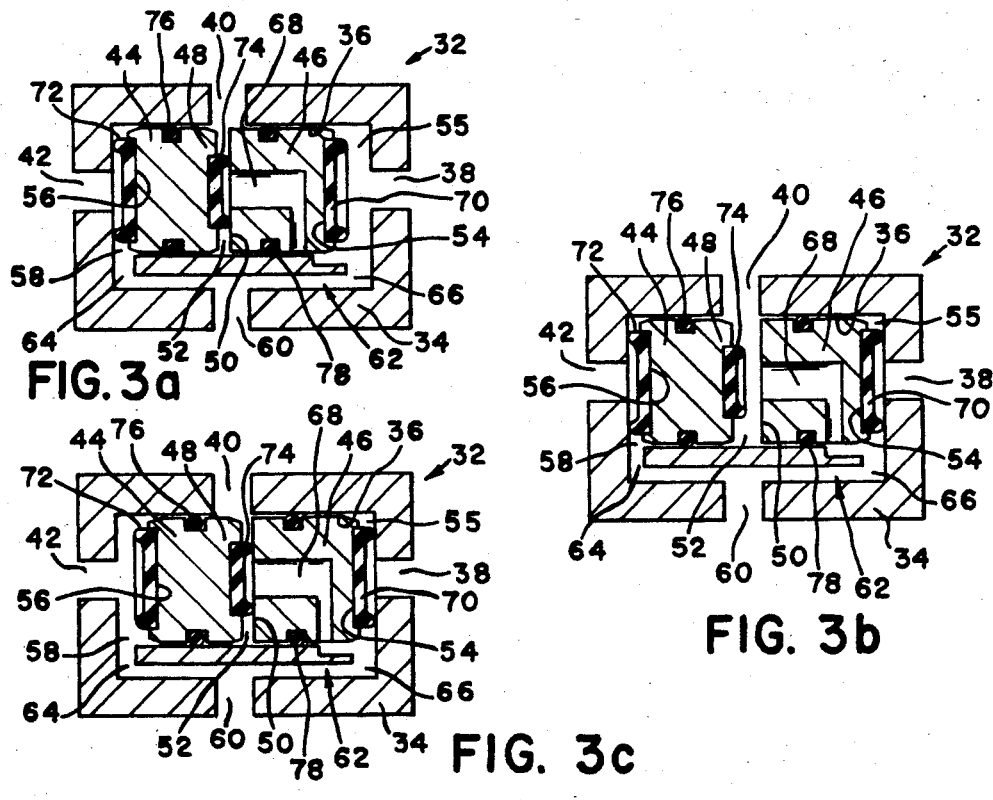
FIG. 3a
FIG. 3b
FIG. 3c

THREE WAY CHECK VALVE

This invention relates to a three way check valve for a vehicle fluid pressure braking system.

Fluid pressure braking systems, particularly those used on articulated vehicles, often must generate a single pressure signal which represents the higher of any of three or more input signals. For example, the service brake application on the trailer portion of a tractor-trailer vehicle is effected by using the higher of the pressures generated by the dual foot valve of the vehicle or by the trailer hand control valve. In existing prior art systems, the three sources are routed through two double check valves connected in series, as will hereinafter be described, to prevent "back-flowing" of air from one source to another. Federal regulations require that each of the sources of fluid pressure be isolated from one another, so that the check valves must not only select one of the fluid pressure sources for connection to the outlet, but must also prevent the flow of fluid pressure from one source to another.

The device disclosed herein selects the highest pressure level from three sources of fluid pressure and delivers the highest pressure level to a common outlet, while preventing back-flowing of fluid pressure from any source to any other source. Accordingly, the two double check valves used in prior art systems are replaced oy a single three way check valve and the necessary piping, fittings, etc., necessary to interconnect the double check valves are eliminated. This not only saves costs, but eliminates potential leak-points in the air brake system. Although a three way check valve is disclosed herein, it will be noted that, by adding inlet ports and shuttles to the device disclosed herein, any number of sources may be used and the higher of these sources be communicated to the outlet ports.

These and other advantages of the invention will become apparent from the following description with reference to the accompanying drawings, in which:

FIG. 1 is a schematic illustration of an existing prior art braking system;

FIG. 2 is a schematic illustration similar to FIG. 1 but illustrating an air brake system with the three way check valve made pursuant to the teachings of the present invention installed therein; and FIGS. 3a, 3b and 3b each illustrate a three way check valve made pursuant to the teachings of the present invention which is installed in the system illustrated in FIG. 2, the three views of FIG. 3 illustrating the various components of the check valve in the positions which they assume when each of the inlet ports is in turn communicated to the outlet port.

Referring now to the drawings, the conventional braking system generally indicated by the numeral 10 in FIG. 1 includes a conventional dual foot valve 12 which is actuated to effect a brake application. When the valve 12 is actuated, isolated outlet ports 14 and 16 are communicated to corresponding isolated inlet ports 15, 17. It should be noted, of course, that the system of FIG. 1 is a simplified system and that the inlet ports 15, 17 and outlet ports 14, 16 are also connected to other components of the fluid pressure braking system besides those illustrated in FIG. 1. The inlets 15, 17 of the valve 12 are connected to isolated fluid pressure sources 18, 20. A trailer hand brake control valve generally indicated by the numeral 22 is actuated to connect an inlet port 23, which is connected to one of the pressure sources 18 or 20, to the outlet port 24 thereof. Outlet port 14 and outlet port 24 are connected to corresponding inlets of a double check valve 26. The outlet of double check valve 26 is connected to one of the inlets of another double check valve 28, the other inlet of which is communicated to the outlet port 16 of the dual brake valve 12. The outlet of check valve 28 is connected through a tractor protection valve (not shown) to the trailer brake control line. It will be noted that the system illustrated in FIG. 1 requires the two double check valves 26, 28, and a pressure line generally indicated by the numeral 30 which interconnects the check valves 26, 28. Of course, the necessary fittings, couplings, and connections are also necessary.

The system illustrated in FIG. 2 is substantially the same as the system illustrated in FIG. 1, except that the double check valves 26, 28, and the pressure line 30 interconnecting them, have been replaced by a three way check valve generally indicated by the numeral 32. Referring now to FIGS. 3a-3c, the check valve 32 includes a housing 34 defining a bore 36 therewithin. An inlet port 38 communicates the bore 36 with the outlet port 24 of the hand control valve 22; another inlet port 40 communicates the bore 36 with the outlet port 14 in the dual brake valve 12; and a third inlet port 42 communicates the bore 36 with the outlet port 16 of the dual brake valve 12.

A pair of shuttle members 44, 46 are slidably mounted in the bore 36 and are arranged to be coaxial with one another and with the bore 36. The contiguous ends 48, 50 of the shuttle members 44, 46 cooperate with one another to define a pressure chamber 52 therebetween which is communicated to the inlet port 40. The opposite end 54 of the shuttle member 46 cooperates with the corresponding end of the bore 36 to define a pressure chamber 55 therebetween which is communicated to the inlet port 38. Similarly, the opposite end 56 of the shuttle member 44 cooperates with the corresponding end of the bore 36 to define a pressure chamber 58 therebetween which communicates with the inlet port 42.

The three way check valve 32 further includes an outlet port 60 which is communicated with the aforementioned tractor protection valve and to the trailer service brake control line (not shown). A passage generally indicated by the numeral 62 communicates the outlet port 60 with each of the chambers 52, 55, and 58 and includes a first branch 64 communicating the outlet port 60 with the chamber 58, a second branch 66 communicating the outlet port 60 with the chamber 55, and a third branch 68 which extends through the shuttle member 46 to communicate the third chamber 52 with the branch 66 of passage 62 and thereby to the outlet port 60. The ends 54, 56 of the shuttle members 44, 46 are provided with seals 70, 72 which are adapted to circumscribe the corresponding ports 38, 42 when the shuttles are urged thereagainst as will be described hereinafter. The shuttle 44 is also provided with a seal 74 which is adapted to circumscribe the entrance to the branch 68 of the passage 62 when the shuttle 46 is urged against the seal 68, as will be described hereinafter. The conventional O-ring seals 76, 78 seal the shuttle members 44, 46 to the wall of the bore 36 in a conventional manner so that the shuttle members isolate each of the ports 38, 40 and 42 from one another through the bore 36.

In operation, FIG. 3a illustrates the positions of the shuttle members 44, 46 when the pressure at inlet port 38 exceeds the pressure level at either the inlet port 40 or the inlet port 42. Because the pressure level in chamber 55 urging the shuttle members to the left viewing FIG. 3a is greater than the pressure level in chamber 58 opposing that movement, the shuttle member 46 is urged into sealing engagement with the shuttle member 44 so that the annular valve member 74 closes communication through the branch 68, and the shuttle member 44 is urged so that its sealing member 72 is sealingly engaged with port 42 to thereby terminate communication into the chamber 58. Accordingly, the branch 66 of passage 62 communicates the chamber 55 with the outlet port 60 and the other inlets ports 40, 42 are sealed from each other and also from the pressure level at the inlet port 38.

Referring now to FIG. 3b, the pressure at inlet port 40 has now increased so that the pressure level there is greater than the pressure level at either of the ports 38 or 42. Since the pressure level acting in chamber 52 on the contiguous ends 48, 50 of the shuttles 44, 46 is now greater than the pressure levels in chambers 55 or 58 opposing such movement, the shuttle members 44, 46 are urged apart and are driven into engagement with the corresponding ends of the bore 36. Accordingly, the annular sealing member 72 is driven into sealing engagement with the end of the bore to terminate communication through the inlet port 42, and, correspondingly, the sealing member 70 is driven into sealing engagement with its corresponding end of the bore 36 to terminate communication through the port 38. Accordingly, since the shuttle member 46 has been driven away from the sealing member 74, the pressure in the chamber 52 is free to communicate through the branch 68 to the outlet port 60.

Referring now to FIG. 3c, pressure level at inlet port 42 has now increased so it is now greater than the pressure level at either inlet port 40 or inlet port 38. Accordingly, the higher pressure level at inlet port 42 acting in chamber 58 drives the shuttle members 44, 46 into engagement with one another. Communication through ports 38 and 40 is thereby terminated, and the port 42 communicates through chamber 58 into the branch 64 of the passage 62 to the outlet port 60.

I claim:

1. Three way check valve comprising a housing having first, second and third inlet ports and an outlet port, said housing defining a bore therewithin, a pair of pressure differential responsive shuttle members slidably mounted in said bore, each of said shuttle members cooperating with a corresponding portion of the bore and with each other to define first, second and third chambers, each of said first, second and third chambers being communicated with a corresponding one of said first, second, and third inlet ports, said shuttle members cooperating wih one another to define said third chamber between the shuttle members, and passage means having branches communicating each of said chambers with the outlet port, said shuttle members being movable in said bore in response to pressure changes at said inlet ports to communicate to said outlet port the chamber communicated with the one of said inlet ports having the highest pressure level, said shuttle members closing communication between the outlet port and the chambers communicated with the other inlet ports, circumferentially extending sealing means carried by each of said shuttle members, each of said sealing means being adapted to control communication between a corresponding one of the inlet ports and said outlet port, each of said sealing means cooperating with its corresponding shuttle member to define circumscribed and non-circumscribed areas on the corresponding shuttle member, one of said circumscribed and non-circumscribed areas defined by each of said sealing means communicating with a corresponding inlet port when the corresponding sealing means blocks communication between its corresponding inlet port and the outlet port, the other of said last-mentioned areas being communicated to the outlet port through a corresponding branch of said passage means when the corresponding sealing means blocks communication between its corresponding inlet port and the outlet port whereby said other area is exposed to the pressure level at said outlet port when the corresponding sealing means prevents communication through the inlet port controlled by the corresponding sealing means.

2. Three way check valve comprising a housing having first, second and third inlet ports and an outlet port, said housing defining a bore therewithin, a pair of pressure differential responsive shuttle members slidably mounted in said bore, each of said shuttle members cooperating with a corresponding portion of the bore and with each other to define first, second and third chambers, each of said first, second and third chambers being communicated with a corresponding one of said first, second and third inlet ports, said shuttle members cooperating with one another to define said third chamber between the shuttle members, and passage means communicating each of said chambers with the outlet port, said shuttle members being movable in said bore in response to pressure changes at said inlet ports to communicate to said outlet port the chamber communicated with the one of said inlet ports having the highest pressure level, said shuttle members closing communication between the outlet port and the chambers communicated with the other inlet ports, each of said shuttle members and said bore being coaxial, each of said shuttle members having a contiguous end facing the contiguous end of the other shuttle member, said third chamber being defined between the contiguous ends of said shuttle members, each of said shuttle members having a facing end opposite its contiguous end, said facing ends facing the corresponding end of the bore to define said first and second chambers respectively between the facing end of each shuttle and the corresponding end of the bore, said passage means including a first branch communicating the first chamber to the outlet port, a second branch communicating said second chamber with the outlet port, and a third branch communicating said third chamber with the outlet port, circumferentially extending sealing means carried by each of said shuttle members, each of said sealing means being adapted to control communication between a corresponding one of the inlet ports and said outlet port, each of said sealing means cooperating with its corresponding shuttle member to define circumscribed and non-circumscribed areas on the corresponding shuttle member, one of said circumscribed and non-circumscribed areas defined by each of said sealing means communicating with a corresponding inlet port when the corresponding sealing means blocks communications between its corresponding inlet port and the outlet port, the other of said last-mentioned areas being communicated to the outlet port through a corresponding branch of said passage means when the corresponding sealing means blocks communications between its corresponding inlet port and the outlet port, whereby said other area is exposed to the pressure level at said outlet port even when the corresponding sealing means prevents communication through the inlet port controlled by the corresponding sealing means.

3. Three way check valve as claimed in claim 2, wherein at least a portion of said third branch extends through one of said shuttle members.

* * * * *